(12) United States Patent
Oettinger

(10) Patent No.: US 8,459,396 B2
(45) Date of Patent: Jun. 11, 2013

(54) BUILDING MACHINE COMPRISING A PRESENCE DETECTION SYSTEM

(75) Inventor: Klaus Oettinger, Altlussheim (DE)

(73) Assignee: Joseph Vögele AG, Ludwigshafen/Rhein (DE)

( * ) Notice: Subject to any disclaimer, the term of this patent is extended or adjusted under 35 U.S.C. 154(b) by 0 days.

(21) Appl. No.: 13/180,069

(22) Filed: Jul. 11, 2011

(65) Prior Publication Data
US 2012/0012415 A1    Jan. 19, 2012

(30) Foreign Application Priority Data
Jul. 13, 2010    (EP) .................................. 10007221

(51) Int. Cl.
B60K 28/04    (2006.01)
(52) U.S. Cl.
USPC ........................... 180/272; 701/50; 340/573.1
(58) Field of Classification Search
USPC ................ 180/272, 273, 275; 701/36, 45, 50; 340/425.5, 500, 527, 573.1
See application file for complete search history.

(56) References Cited

U.S. PATENT DOCUMENTS

| | | | | | |
|---|---|---|---|---|---|
| 5,219,413 | A | * | 6/1993 | Lineberger | 180/272 |
| 5,871,232 | A | * | 2/1999 | White | 280/735 |
| 6,020,812 | A | * | 2/2000 | Thompson et al. | 340/438 |
| 6,092,976 | A | * | 7/2000 | Kamiya | 414/636 |
| 6,145,874 | A | * | 11/2000 | Modzelewski et al. | 280/735 |
| 6,252,240 | B1 | * | 6/2001 | Gillis et al. | 250/559.38 |
| 6,290,255 | B1 | * | 9/2001 | Stanley et al. | 280/735 |
| 6,598,900 | B2 | * | 7/2003 | Stanley et al. | 280/735 |
| 6,601,669 | B1 | * | 8/2003 | Agnew | 180/275 |
| 6,614,721 | B2 | * | 9/2003 | Bokhour | 367/128 |
| 7,196,629 | B2 | * | 3/2007 | Ruoss et al. | 340/573.1 |
| 7,675,296 | B2 | * | 3/2010 | Lambert et al. | 324/687 |
| 7,891,457 | B2 | * | 2/2011 | Holland et al. | 180/273 |
| 8,152,198 | B2 | * | 4/2012 | Breed et al. | 280/735 |
| 2007/0203630 | A1 | * | 8/2007 | Vitale et al. | 701/50 |
| 2008/0173147 | A1 | * | 7/2008 | Kovarik et al. | 83/62 |

FOREIGN PATENT DOCUMENTS

| | | |
|---|---|---|
| GB | 2353180 A | 2/2001 |
| GB | 2462590 A | 2/2010 |

(Continued)

OTHER PUBLICATIONS

English translation of Office Action mailed Dec. 4, 2012, which issued in corresponding Japanese Application No. 2011-153059.

Primary Examiner — Joseph Rocca
(74) Attorney, Agent, or Firm — Fish & Richardson P.C.

(57) ABSTRACT

A building machine, especially a road finishing machine, comprising a presence detection system. The presence detection system comprises a sensor which is integrated in the control panel of the building machine. By means of the sensor a distance measurement can be carried out, which determines whether the operator is properly seated on the driver's seat of the building machine or whether he stands properly at the standing work place. In order to determine the presence a tolerance range may be specified, which allows a slight movement of the operator on the driver's seat. If the operator approaches the limits of the tolerance range he is asked in time by warning signals to be seated again properly on the driver's seat or adopt a proper position at the standing work place. If the sensor detects no operator on the driver's seat or at the standing work place all of the functions of the building machine are stopped in order to make sure that the work site is safe.

17 Claims, 2 Drawing Sheets

FOREIGN PATENT DOCUMENTS

Figure 1:
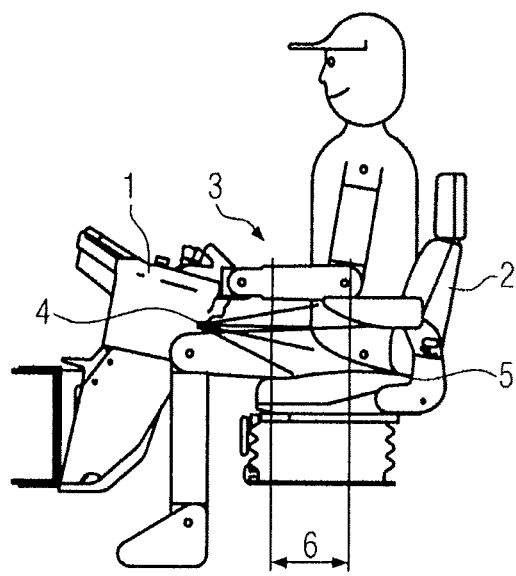

| | | |
|---|---|---|
| JP | 2034434 Y2 | 9/1990 |
| JP | 4039145 A | 2/1992 |
| JP | 2005170542 A | 6/2005 |
| JP | 2009023545 A | 2/2009 |

* cited by examiner

BUILDING MACHINE COMPRISING A PRESENCE DETECTION SYSTEM

The invention relates to a building machine having a system for detecting the presence of an operator integrated into the control panel of the machine and to a method for detecting the presence of the machine operator in the driver's seat or in a standing operator's position.

State and federal regulations afford the operator of a machine a high degree of work safety. This is guaranteed if the operator does not run the risk of getting injured or is warned in time of an imminent danger.

Also, a machine has to emit a signal in time if the operator is no longer capable of acting or if he is no longer capable of operating the machine properly. If this is the case, the operator is sent warning signals in order to draw his attention to a possible danger.

A safety device used in rail vehicles is the dead man's button, which the vehicle operator has to actuate at certain intervals in order to signal the system that he is still awake. If this button is not pressed the system issues a visual or audible warning. If this warning is ignored by the vehicle operator the system assumes that the vehicle operator is no longer capable of acting, and automatically stops the train in order to prevent an accident.

In the field of road construction, especially in road finishing machines, seat contact switches are used, which detect whether the seat of the vehicle driver is occupied. If the seat contact switch is activated the road finishing machine assumes that the operator is sitting on the driver's seat, so that all work functions are made available to the operator. As opposed to this all work functions are blocked as soon as the seat contact switch opens. This involves the problem that the seat contact switch opens even if the operator makes small movements or moves slightly upwardly from the seat, thereby stopping the operation of the road finishing machine. However, an abrupt stop of the operating function of the road finishing machine leads to marks in the road pavement and to damage of the asphalt surface.

Also, it is critical that a seat contact switch, as is installed in road finishing machines, not only issues a signal when the seat is occupied by a person, but also when objects are placed on the seat surface. By this, an operator can trick the road finishing machine into thinking that the driver's seat is properly occupied, even though the driver is located elsewhere on the road finishing machine. In this situation, the driver can no longer safely operate the road finishing machine.

A seat contact switch is known, for instance, from DE 37 11 677 C2, which is installed in a vehicle seat. As soon as two spaced apart contact surfaces are pressed together the vehicle is signalled that the vehicle driver is properly seated on the driver's seat. It is a drawback, however, that in this arrangement a plurality of mechanical springs have to be used, since such springs are particularly susceptible to wear.

In the light of the described prior art the present invention has as its object to provide a building machine using simple constructive means, which guarantees an enhanced degree of work safety for the operator and contributes to an improved road construction quality. At the same time, it is the object to provide a method that is used to check the presence of an operator on a building machine without limiting the mobility of the operator too much.

The above object is achieved with the apparatus of the present invention.

The present invention relates to a building machine, especially to a road finishing machine, comprising a control panel, a driver's seat or a standing work position for the operator, and a presence detection system comprising a sensor configured to detect whether the operator is present on the driver's seat or at the standing work position. As was described above, seat contact switches are used in practice, which are directly integrated in the driver's seat and react on detecting a load on the driver's seat. As opposed to this the sensor of the presence detection system according to the invention is integrated in the control panel of the building machine. The sensor monitors the presence of the operator on the driver's seat or at the standing work position and permits slight movements of the operator. According to the invention it is impossible to bypass the sensor, as would be possible with the seat contact switch by an object placed on the driver's seat. Another technical advantage of the invention is that the sensor integrated in the control panel is well protected and insensitive to irregularities in the road surface on which the road finishing machine is moving. As opposed to this a seat contact switch reacts sensitively to an upward and downward movement of the driver's seat.

In a useful embodiment the sensor is configured to detect in a non-contact manner whether the operator is present. The non-contact presence detection does not involve the mechanical deformation of components, as is the case with a conventional seat contact switch. Therefore, no signs of wear have to be expected with the non-contact measurement.

Preferably, the sensor is a capacitive, inductive, ultrasonic or infrared sensor. These sensors can detect the proper presence of the operator without problems, and they react reliably on different body sizes of the operator.

Also, it is an advantage if the presence detection system is configured to detect on the basis of a distance measurement whether the operator is present. This provides for a reliable and technically enhanced alternative as compared with the weight-based presence detection of a prior seat contact switch.

Preferably, the presence detection system defines a medium range of operator movement which lies between the driver's seat or the standing work place and the control panel. The medium range of driver movement creates a basic condition for the presence detection system, which is accompanied by a safe initial start-up of the presence detection system.

In a further useful embodiment of the invention the presence detection system is configured to shift the range of driver movement horizontally depending on the adjustment of the driver's seat. Thus, it is achieved that the presence detection system adjusts itself to the position of the seat and to the height of the operator.

Preferably, the sensor is configured to detect the distance between the sensor and the operator, wherein the distance defines a starting value. In this case, too, no components are subjected to mechanical stress.

In order to ensure a safe and reliable initial start-up of the presence detection system, the presence detection system is configured to detect whether the starting value determined by the sensor is within the allowable range of driver movement. By this, a simple plausibility check is performed at the beginning, to determine whether the operator is really seated on the driver's seat or is standing at the standing work place.

Preferably, the presence detection system is additionally configured to determine on the basis of the starting value a constant tolerance range around the starting value. The tolerance range operates to prevent abrupt stoppage of the building machine or road finishing machine whenever the operator makes a slight movement.

Moreover, the sensor can be configured to detect whether the operator is within the tolerance range. In contrast to the seat contact switch, which only has two operating states, namely closed or not closed, the sensor thus has the technical advantage to allow a movement of the operator area-wise.

The work safety for the operator is additionally improved if the presence detection system is configured to send warning messages to the operator when the operator approaches a limit of the tolerance range. Thus, the operator can be asked in time to adopt a proper sitting posture necessary for a safe operation of the building machine.

The operator as well as other present staff can be protected from the building machine operating itself independently if the presence detection system is configured to stop the operation of the building machine when the operator leaves the tolerance range.

The subject matter of the invention also is a method for checking for the presence of an operator on a driver's seat or at a standing work position of a building machine, wherein a presence detection system, which comprises a sensor that is integrated in the control panel, is activated first, a measurement is carried out by the sensor subsequently in order to determine a distance between the operator and the sensor, and wherein it is finally checked whether the distance is within a tolerance range.

Preferably, all of the functions of the building machine are then available to the operator as long as the distance determined by the sensor is within the tolerance range.

The method can also include the determination of a starting value. The starting value represents the distance of the operator relative to the sensor. By an optional check whether the starting value is within a medium range of driver movement defined by the presence detection system it can be determined at first whether an operator has properly seated himself on the driver's seat or whether he is properly standing at the standing work place.

Thus, the invention particularly offers the technical advantage that slight movements made by the operator, either on the driver's seat or at the standing work place, do not result in an abrupt stop of the building machine, but that slight movements of the operator are allowable depending on the tolerance range. These movements may by all means be necessary for a safe operation of the building machine or road finishing machine and for a faultless work result.

Figure 2:
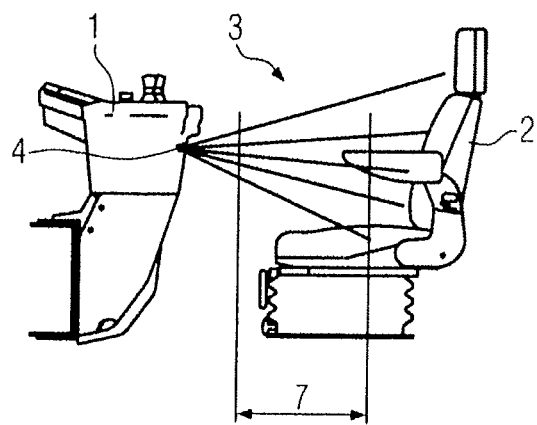
Figure 3:
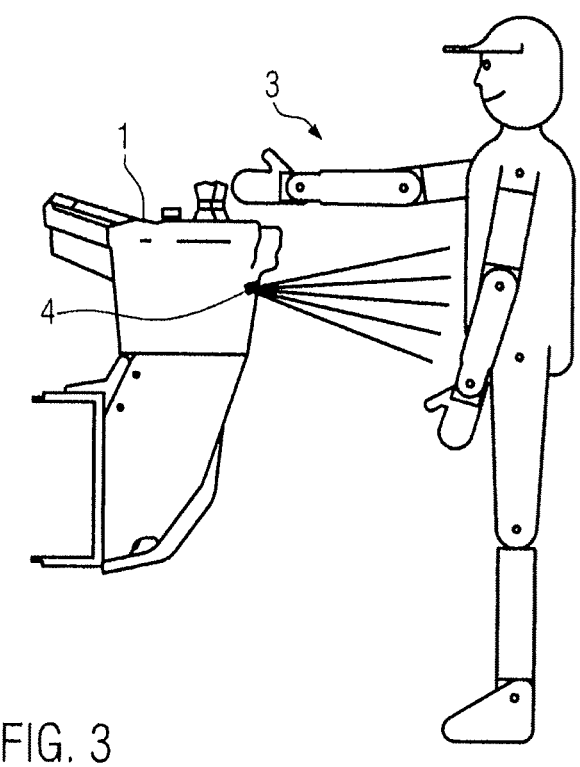

The subject matter of the invention is explained by means of the drawings. In the drawings:

FIG. 1 shows a presence detection measurement, represented by the detection of the operator on the driver's seat by the sensor integrated in the control panel, and FIG. 2 shows a schematic representation to illustrate the medium range of allowable driver movement of the presence detection system, and FIG. 3 shows a presence detection measurement, represented at the standing work place of a building machine.

FIG. 1 shows an operator sitting on a driver's seat 2 in front of a control panel 1 in a building machine. Different control functions are provided on the control panel 1. FIG. 1 additionally shows a presence detection system 3, which comprises a sensor 4 that is integrated in the control panel 1. The lines pointing from the control panel 1 towards the operator represent a measurement by sensor 4. This measurement is to check whether the operator is seated on the driver's seat 2. FIG. 1 further shows a starting value 5 which is measured by sensor 4. The starting value 5 marks the distance between the sensor 4 and the operator. The starting value 5 varies depending on the body height or girth of the operator. Additionally, FIG. 1 shows a tolerance range 6. The tolerance range 6 orients itself by the starting value 5 and extends uniformly from the starting value 5 in a positive or negative direction, i.e. to the right or to the left viewed from the starting value 5.

FIG. 2 shows the control panel 1 and the driver's seat 2, without an operator being seated on the driver's seat 2. In addition, FIG. 2 shows a medium range of allowable driver movement 7. The medium range of driver movement 7 represents a basic condition for the initial start-up of the presence detection system 3. The operation of the presence detection system 3 can be started when the starting value 5 falls into the medium range of allowability 7.

FIG. 3 shows an operator standing at a standing work place in front of the control panel 1 of a building machine. Moreover, a sensor 4 is shown, which is disposed in the control panel 1 and forms part of the presence detection system 3. The sensor 4 measures the distance between itself and the operator of the building machine. At the same time, the presence detection system 3 determines whether the operator is properly situated at the standing work place and whether the measured distance is within a tolerance range, respectively. If the sensor 4 measures a distance that is within the tolerance range, all operating functions of the building machine are available to the operator. A measured distance outside the tolerance range, however, leads to a stop of all operating functions because the presence detection system 3 assumes that the operator has left the standing work place.

If the ignition key of the building machine is turned or if the main power controller is operated, the presence detection system 3 of the building machine can be activated. The sensor 4 then checks whether an operator is seated on the driver's seat 2 or stands at the standing work place. If the sensor 4 determines a starting value 5 that is within the medium range of driver movement 7 the presence detection system 3 is activated. In order to grant the operator enough freedom of movement whilst not allowing him to leave the driver's seat 2 or standing work place, a tolerance value 6 near the starting value 5 is determined. During the operation of the building machine the sensor 4 measures the distance between itself and the operator. The presence detection system 3 compares the distance measured by the sensor 4 relative to the tolerance range 6 and checks whether the operator remains within the tolerance range 6 during the operation of the building machine or road finishing machine. If this is the case, the system 3 detects that the operator is properly located on the driver's seat 2 in front of the control panel. The distance measured by the sensor 4 varies with a movement made by the operator. If the presence detection system 3 detects that the measured distance approaches a limit of the tolerance range 6 an audible or visual signal is generated, urging the operator to seat himself again properly on the driver's seat 2 or adopt a proper position at the standing work place. If the distance measured by sensor 4 is outside the tolerance range 6, however, it means that the operator has left the driver's seat 2 or the standing work place, as a result of which all functions of the building machine are stopped.

The presence detection system 3 can also be used without any problems in other building machines that are operated by a standing operator. The presence detection system 3 can prevent, for instance, a vibrator from operating itself independently when left alone by the operator. Thus, the work safety can be increased, with the result that injuries at work are reduced.

The invention claimed is:

1. Building machine comprising:
a control panel,
a driver's seat for an operator, and
a presence detection system comprising a wireless sensor integrated in the control panel of the building machine and configured to detect whether the operator is present on the driver's seat by measuring the distance between the operator and the sensor, and wherein the sensor is configured to shift the range of driver movement horizontally depending on the adjustment of the driver's seat.

2. Building machine according to claim 1 wherein the sensor is configured to detect in a non-contact manner whether the operator is present.

3. Building machine according to claim 1 wherein the sensor is a capacitive, inductive, ultrasonic or infrared sensor.

4. Building machine according to claim 1, wherein the presence detection system can be activated and/or switched off by an ignition key or by a main power controller.

5. Building machine, comprising:
a control panel,
a driver's seat for an operator and
a presence detection system comprising a wireless sensor integrated in the control panel of the building machine and configured to detect whether the operator is present on the driver's seat by measuring the distance between the operator and the sensor,
wherein the presence detection system defines a medium range of driver movement which lies between the driver's seat and the control panel, and
wherein the presence detection system is configured to shift the range of driver movement horizontally depending on the adjustment of the driver's seat.

6. Building machine according to claim 5, wherein the sensor is configured to detect the distance between the sensor and the operator, wherein the distance defines a starting value.

7. Building machine according to claim 6, wherein the presence detection system is configured to detect whether the starting value determined by the sensor is within the range of driver movement.

8. Building machine according to claim 6, wherein the presence detection system is configured to determine on the basis of the starting value a constant tolerance range around the starting value.

9. Building machine according to claim 8, wherein the sensor is configured to detect whether the operator is within the tolerance range.

10. Building machine according to claim 8, wherein the presence detection system is configured to send warning messages to the operator when the operator approaches a limit of the tolerance range.

11. Building machine according to claim 8, wherein the presence detection system is configured to stop the operation of the building machine when the operator leaves the tolerance range.

12. Method for checking the presence of an operator on a driver's seat of a building machine, comprising the steps of:
activating a presence detection system comprising a sensor that is integrated in a control panel, wherein the presence detection system is configured to shift the range of driver movement horizontally depending on the adjustment of the driver seat,
carrying out a measurement by the sensor in order to determine a distance between the operator and the sensor, and
checking whether the distance is within a tolerance range.

13. Method according to claim 12, wherein all of the functions of the building machine are available as long as the distance determined by the sensor is within the tolerance range.

14. An operator safety system for a road building machine comprising
(i) a control panel for the safety system, (ii) an operating position located on the machine, (iii) a distance sensor integrated into the control panel and configured to detect whether the machine operator is in the operating position, and (iv) a driver's seat, and wherein the presence detection system is configured to shift the range of driver movement horizontally depending on the adjustment of the driver seat.

15. The operator safety system of claim 14 wherein the sensor is a member selected from the group consisting of inductive, capacitive , infra-red or ultra-sonic sensors.

16. The operator safety system of claim 14 wherein the sensor is configured to signal the operator when the operator moves outside of a predetermined tolerance range.

17. Building machine comprising:
a control panel,
a driver's seat or a standing work position for an operator, and
a presence detection system comprising a wireless sensor integrated in the control panel of the building machine and configured to detect a starting position for the operator by measuring the distance between the operator and the sensor and to shift the range of permitted driver movement horizontally within a tolerance limit calculated from the starting position and dependent on adjustment of the driver's seat.

* * * * *